(12) United States Patent
Alber

(10) Patent No.: US 11,148,822 B2
(45) Date of Patent: Oct. 19, 2021

(54) DRIVE SYSTEM ARRANGEMENT FOR ROTORCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 599 days.

(21) Appl. No.: 15/758,056

(22) PCT Filed: Aug. 25, 2016

(86) PCT No.: PCT/US2016/048642
§ 371 (c)(1),
(2) Date: Mar. 7, 2018

(87) PCT Pub. No.: WO2017/091260
PCT Pub. Date: Jun. 1, 2017

(65) Prior Publication Data
US 2018/0244396 A1    Aug. 30, 2018

Related U.S. Application Data

(60) Provisional application No. 62/219,019, filed on Sep. 15, 2015.

(51) Int. Cl.
*B64D 35/08* (2006.01)
*B64C 27/14* (2006.01)
(Continued)

(52) U.S. Cl.
CPC .............. *B64D 35/08* (2013.01); *B64C 27/14* (2013.01); *B64C 27/82* (2013.01); *B64D 35/02* (2013.01);
(Continued)

(58) Field of Classification Search
CPC ........ B64D 35/08; B64D 35/04; B64D 35/02; B64C 27/14; B64C 27/82; B64C 2027/8236; F02C 6/20; F05D 2220/329
See application file for complete search history.

(56) References Cited

U.S. PATENT DOCUMENTS 3,034,583 A    5/1962  Best
3,375,997 A    4/1968  Gist
(Continued)

FOREIGN PATENT DOCUMENTS

EP    2690010 A1    1/2014
EP    2963247 A1    1/2016
(Continued)

OTHER PUBLICATIONS

PCT ISR Written Opinion; International Application No. PCT/US 16/48642; International Filing Date: Aug. 25, 2016; dated May 19, 2017; pp. 1-4.
(Continued)

*Primary Examiner* — Assres H Woldemaryam
*Assistant Examiner* — Aaron M Rodziwicz
(74) *Attorney, Agent, or Firm* — Foley & Lardner LLP

(57) ABSTRACT

A drive system for a rotorcraft includes at least one engine, the engine including a compressor section, and a turbine section positioned rearward from the compressor section. A main rotor input shaft extends from a rotor power turbine of the turbine section and is connectable to a main rotor assembly of the rotorcraft to transfer rotational energy from the rotor power turbine to the main rotor assembly. An auxiliary input shaft extends from an auxiliary power turbine of the turbine section and is connectible to an auxiliary rotor assembly of the rotorcraft to transfer rotational energy from the auxiliary power turbine to the auxiliary rotor assembly.

14 Claims, 5 Drawing Sheets

(51) Int. Cl.
  *B64D 35/04* (2006.01)
  *B64C 27/82* (2006.01)
  *B64D 35/02* (2006.01)
  *F02C 6/20* (2006.01)

(52) U.S. Cl.
  CPC ............... *B64D 35/04* (2013.01); *F02C 6/20* (2013.01); *B64C 2027/8236* (2013.01); *F05D 2220/329* (2013.01)

(56) References Cited

U.S. PATENT DOCUMENTS

| | | | |
|---|---|---|---|
| 3,423,048 | A | 1/1969 | Clarke et al. |
| 3,483,696 | A | 12/1969 | Gilbert et al. |
| 3,678,690 | A | 7/1972 | Shohet et al. |
| 4,446,696 | A | 5/1984 | Sargisson et al. |
| 4,651,521 | A | 3/1987 | Ossi |
| 8,061,119 | B2 * | 11/2011 | Agrawal .............. B64C 27/22 60/232 |
| 8,324,746 | B2 | 12/2012 | Bradbrook |
| 8,511,058 | B2 | 8/2013 | Agrawal et al. |
| 10,549,852 | B2 * | 2/2020 | Devito ............... B64C 27/82 |
| 10,562,641 | B2 * | 2/2020 | Pantalone, III ........ B64D 33/04 |
| 2009/0113871 | A1 * | 5/2009 | Certain ............... B64D 27/10 60/39.43 |
| 2009/0140182 | A1 | 6/2009 | Agrawai et al. |
| 2009/0189011 | A1 * | 7/2009 | Bahadir ............... B64C 27/10 244/17.11 |
| 2010/0154435 | A1 | 6/2010 | Exley et al. |
| 2012/0167591 | A1 | 7/2012 | Drachsler et al. |
| 2013/0147204 | A1 * | 6/2013 | Botti ............... B64C 27/14 290/1 A |
| 2014/0312177 | A1 | 10/2014 | Gaonjur |

FOREIGN PATENT DOCUMENTS

| | | |
|---|---|---|
| GB | 2225297 A | 5/1990 |
| WO | 2012022845 A2 | 2/2012 |
| WO | 2014025444 A2 | 2/2014 |

OTHER PUBLICATIONS

PCT Notification of Transmittal of The International Search Report; International Application No. PCT/US 16/48642; International Filing Date: Aug. 25, 2016; dated May 19, 2017; pp. 1-7.

* cited by examiner

DRIVE SYSTEM ARRANGEMENT FOR ROTORCRAFT

CROSS REFERENCE TO RELATED APPLICATIONS

This application is a National Stage application of PCT/US2016/048642, filed Aug. 25, 2016, which claims the benefit of U.S. Provisional Application No. 62/219,019, filed Sep. 15, 2015, both of which are incorporated by reference in their entirety herein.

BACKGROUND

The subject matter disclosed herein relates to the rotary wing aircraft and, more specifically to power distribution from engines of a rotary wing aircraft.

In some rotary wing aircraft configuration, one or more engines are used to drive both a main rotor system, which provides lift to the aircraft, and a translational thrust or propulsor system. Power is extracted from the engine via a turboshaft arrangement as shown in FIG. 5. Power is extracted via the shaft 100 at one end of the engine 102 and to a gearbox 104. The gearbox 104 is utilized to transfer the power from the shaft 100 to a main rotor assembly 106. Further, an auxiliary shaft 108 is operably connected to the gearbox 104 to extract power from the gearbox 104 for use by a propulsor 110. Such an arrangement is complex, requiring multiple shafts and power take offs to drive the propulsor 110. Further, depending on the propulsor location relative to the main rotor assembly 106, for example, a tail mounted propulsor 110, a long shaft assembly extending from the gearbox 104 is required to reach the propulsor 110 location. A simpler, less complex drive system for the propulsor is desired.

BRIEF DESCRIPTION

In one embodiment, a drive system for a rotorcraft includes at least one engine. The engine includes a compressor section and a turbine section located rearward from the compressor section. A main rotor input shaft extends from a rotor power turbine of the turbine section and is connectable to a main rotor assembly of the rotorcraft to transfer rotational energy from the rotor power turbine to the main rotor assembly. An auxiliary input shaft extends from an auxiliary power turbine of the turbine section and is connectible to an auxiliary rotor assembly of the rotorcraft to transfer rotational energy from the auxiliary power turbine to the auxiliary rotor assembly.

Additionally or alternatively, in this or other embodiments the main rotor input shaft extends from the engine in a first direction, and the auxiliary input shaft extends from the engine in a second direction opposite the first direction.

Additionally or alternatively, in this or other embodiments the main rotor input shaft extends from the rotor power turbine through the compressor to connect with the main rotor assembly.

Additionally or alternatively, in this or other embodiments the auxiliary rotor assembly is a propulsor.

Additionally or alternatively, in this or other embodiments the drive system includes at least two engines, each engine including a main rotor input shaft extending from a rotor power turbine of the turbine section and connectable to the main rotor assembly of the rotorcraft, and an auxiliary input shaft extending from an auxiliary power turbine of the turbine section and connectible to an auxiliary rotor assembly of the rotorcraft.

Additionally or alternatively, in this or other embodiments a first auxiliary input shaft of a first engine of the at least two engines is connectible to a first auxiliary rotor, and a second auxiliary input shaft of a second engine of the at least two engines is connectible to a second auxiliary rotor.

Additionally or alternatively, in this or other embodiments the at least one engine includes at least two engines, including a first engine having a main rotor input shaft extending from a rotor power turbine of the turbine section and connectable to the main rotor assembly of the rotorcraft, and a second engine having an auxiliary input shaft extending from an auxiliary power turbine of the turbine section and connectible to an auxiliary rotor assembly of the rotorcraft.

In another embodiment a rotorcraft includes an airframe, a main rotor assembly operably connected to the airframe and an auxiliary rotor assembly operably connected to the airframe. A drive system is positioned at the airframe and includes at least one engine. The engine includes a compressor section and a turbine section located rearward from the compressor section. A main rotor input shaft extends from a rotor power turbine of the turbine section and is operably connected to the main rotor assembly to transfer rotational energy from the rotor power turbine to the main rotor assembly. An auxiliary input shaft extends from an auxiliary power turbine of the turbine section and is operably connected to the auxiliary rotor assembly to transfer rotational energy from the auxiliary power turbine to the auxiliary rotor assembly.

Additionally or alternatively, in this or other embodiments the main rotor input shaft extends from the engine in a first direction, and the auxiliary input shaft extends from the engine in a second direction opposite the first direction.

Additionally or alternatively, in this or other embodiments the main rotor input shaft extends from the rotor power turbine through the compressor section to connect with the main rotor assembly.

Additionally or alternatively, in this or other embodiments the auxiliary rotor assembly is a propulsor.

Additionally or alternatively, in this or other embodiments the drive system includes at least two engines, each engine including a main rotor input shaft extending from a rotor power turbine of the turbine section and connectable to the main rotor assembly, and an auxiliary input shaft extending from an auxiliary power turbine of the turbine section and connectible to the auxiliary rotor assembly.

Additionally or alternatively, in this or other embodiments a first auxiliary input shaft of a first engine of the at least two engines is connectible to a first auxiliary rotor assembly, and a second auxiliary input shaft of a second engine of the at least two engines is connectible to a second auxiliary rotor assembly.

Additionally or alternatively, in this or other embodiments the drive system includes at least two engines, including a first engine having a main rotor input shaft extending from a rotor power turbine of the turbine section and connectable to the main rotor assembly, and a second engine having an auxiliary input shaft extending from an auxiliary power turbine of the turbine section and connectible to the auxiliary rotor assembly.

Additionally or alternatively, in this or other embodiments the main rotor assembly is a dual, counter rotating coaxial main rotor assembly.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
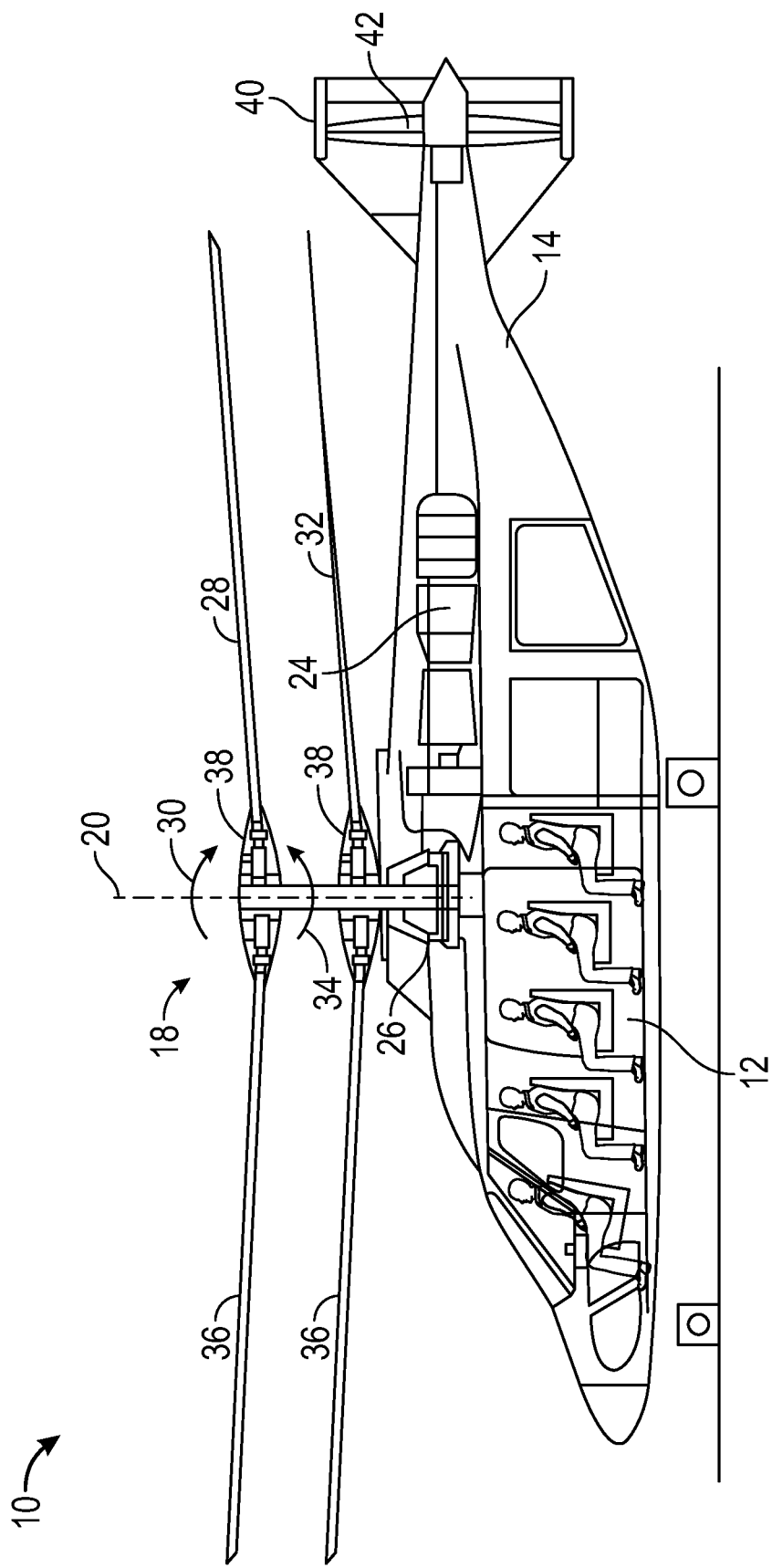
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a main rotor gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30.

While, in FIG. 1, the first direction 30 is illustrated as counter-clockwise and the second direction 34 is illustrated as counter clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes an auxiliary rotor, such as a propeller rotor or propulsor 42 connected to and driven by the engine 24. While shown in the context of a pusher-prop configuration, it is understood that the propulsor 42 could also be more conventional puller prop or could be variably facing so as to provide torque in addition to or instead of translational thrust.

Figure 2:
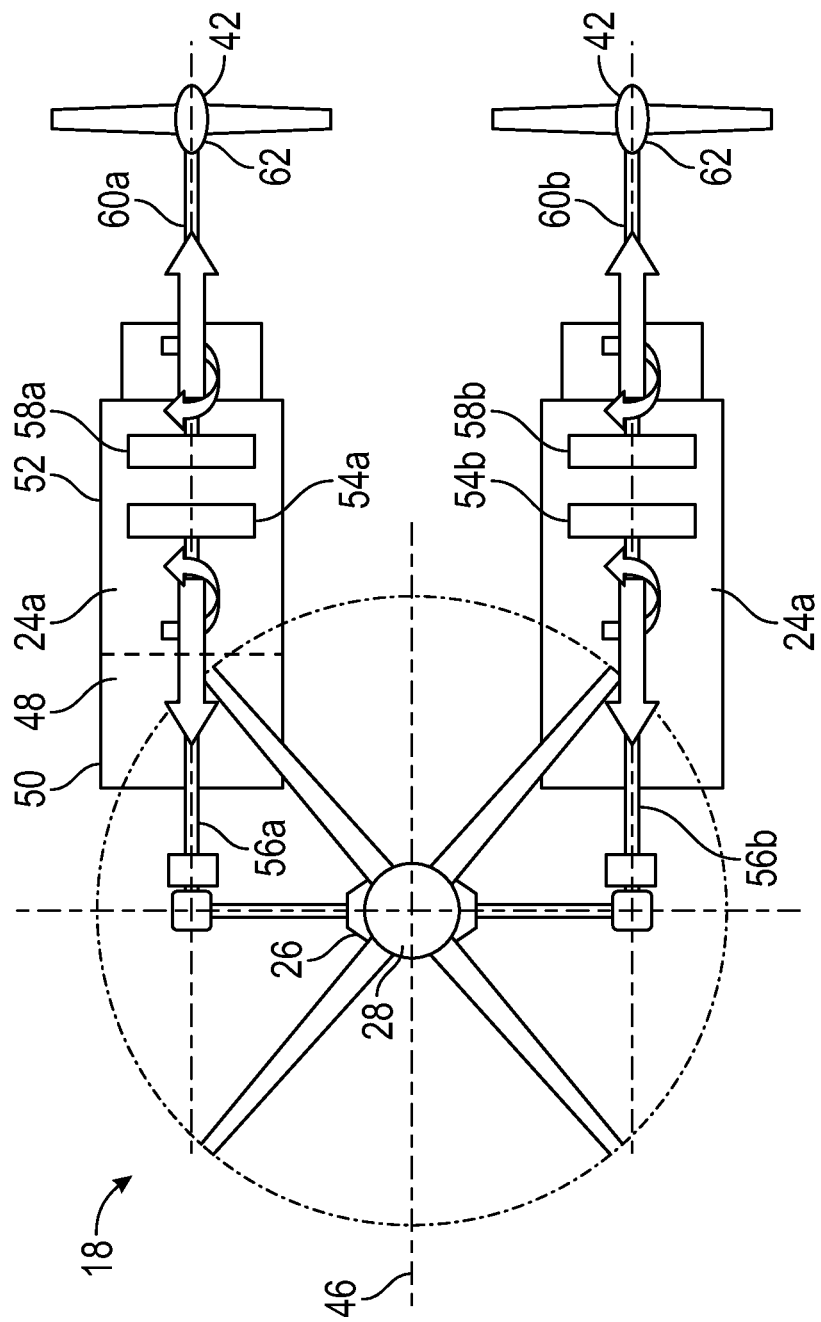
FIG. 2 is a schematic view of an embodiment of a drive system arrangement for a rotorcraft.

FIG. 2 illustrates an embodiment of a drive train arrangement for the helicopter 10. The helicopter 10 illustrated utilizes two gas turbine engines 24, while in other embodiments other numbers of engines 24, for example, one or three engines 24, may be utilized. The engines 24 are arranged such that one engine 24 is located at each lateral side of the helicopter 10, with reference to aircraft longitudinal axis 46. Each engine 24 has a compressor section 48 located nearest a forward end 50 of the engine 24 and a turbine section 52 located aft of the compressor section 48. The turbine section 52 extracts work from combustion gases to drive the compressor section 48.

Each engine 24 additionally includes a rotor power turbine 54 at the turbine section 52. The rotor power turbine 54 is connected to a rotor input shaft 56 extending through the compressor section 48 and toward the main rotor gearbox 26. The rotor power turbine 54 extracts rotational energy from the engine 24 and transmits the rotational energy to the main rotor gearbox 26 via the rotor input shaft 56. The main rotor gearbox 26 transmits the rotational energy to the main rotor assembly 18 to drive the upper rotor assembly 28 and the lower rotor assembly 32.

Figure 3:
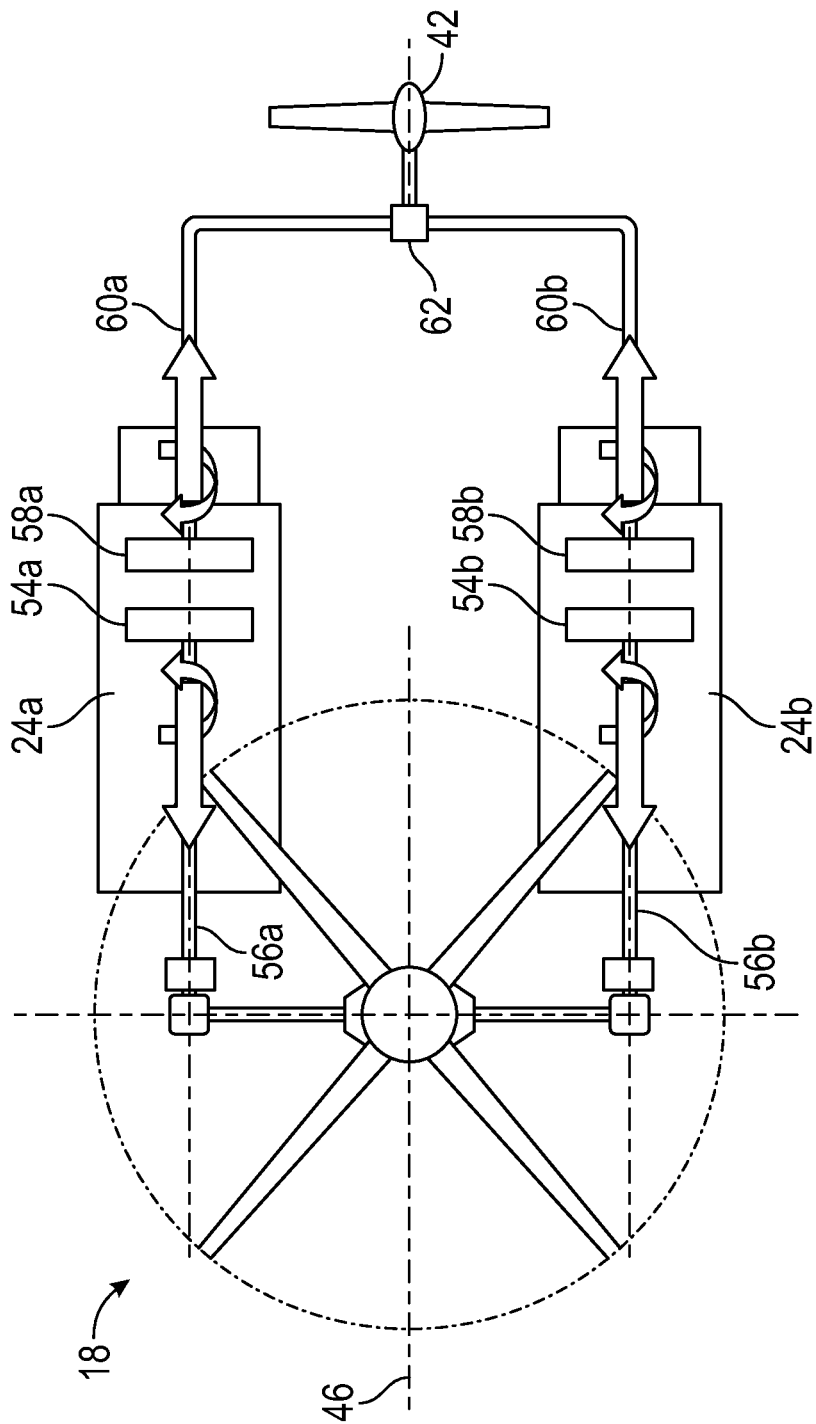
FIG. 3 is a schematic view of another embodiment of a drive system for a rotorcraft.

Each engine 24 further includes a propulsor power turbine 58 connected to a propulsor input shaft 60. The propulsor input shaft 60 extends from the turbine section 52 in a direction opposite the rotor input shaft 56, in some embodiments, rearwardly with reference to normal helicopter flight orientation. The propulsor power turbine 58 extracts rotational energy from the engine 24 and transmits the rotational energy to the propulsor 42 via the propulsor input shaft 60. In some embodiments, a propulsor gearbox 62 connects the propulsor input shaft 60 to the propulsor 42 to transfer the rotational energy from the propulsor input shaft 60 to the propulsor 42. In the embodiment of FIG. 2, a first propulsor power turbine 58a of the first engine 24a drives a first propulsor 42a and a second propulsor power turbine 58b of the second engine 24b drives a second propulsor 42b. In an alternative embodiment, shown in FIG. 3, both propulsor input shafts 60a, 60b are connected to and drive a single propulsor 42 via propulsor gearbox 62. In some embodiments, the rotor power turbine 54 and/or the propulsor power turbine 58 may have variable geometry blades that would allow tailoring within the engine 24 to allow extraction of the proper power and not severely and adversely impact the performance of the adjacent one. For example, in instances where power is not required for thrust via the propulsor power turbine 58, the blades of the propulsor power turbine 58 could be aligned more with the flow to minimize losses within the engine 24.

Figure 4:
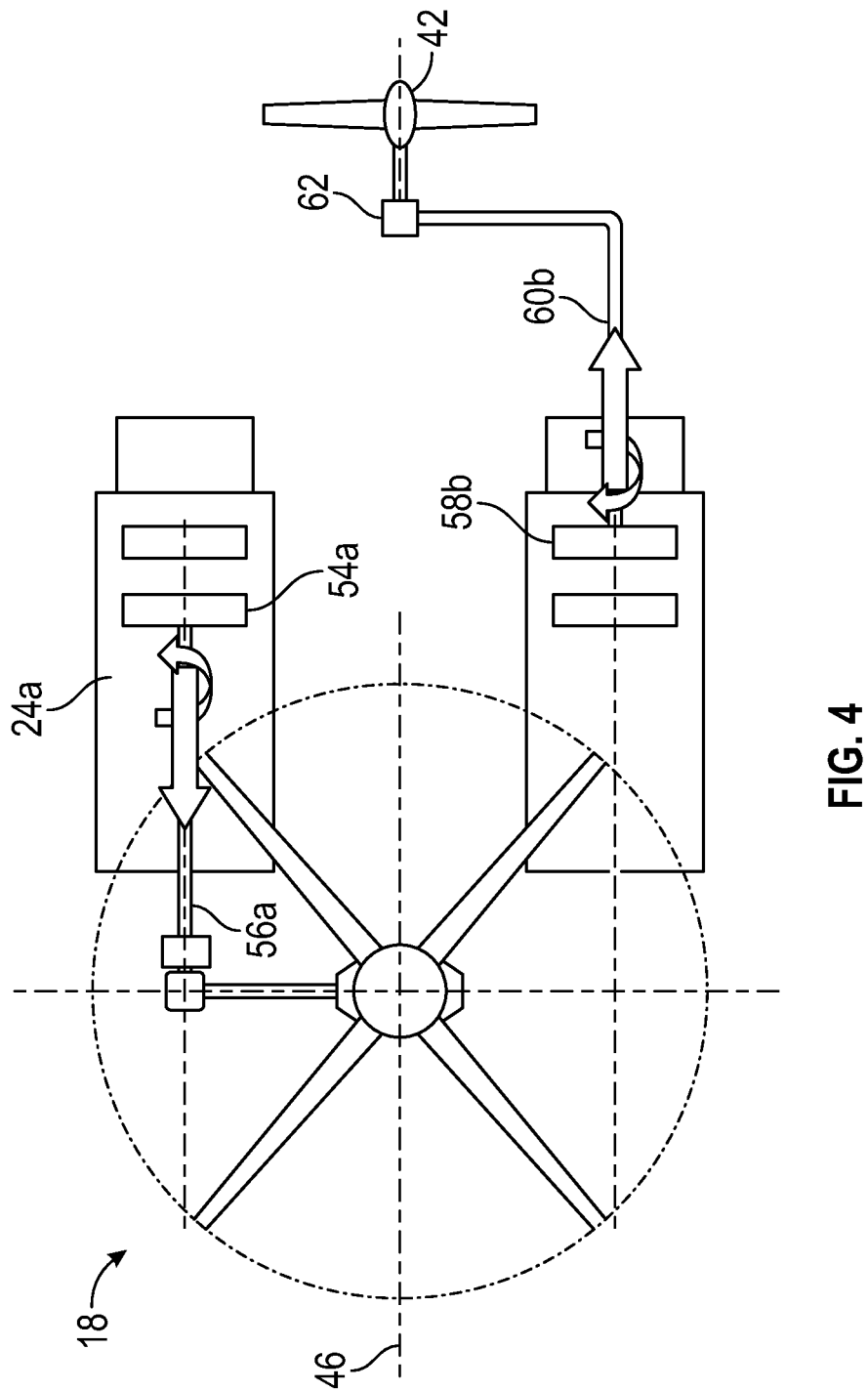
FIG. 4 is a schematic view of yet another embodiment of a drive system for a rotorcraft.
Figure 5:
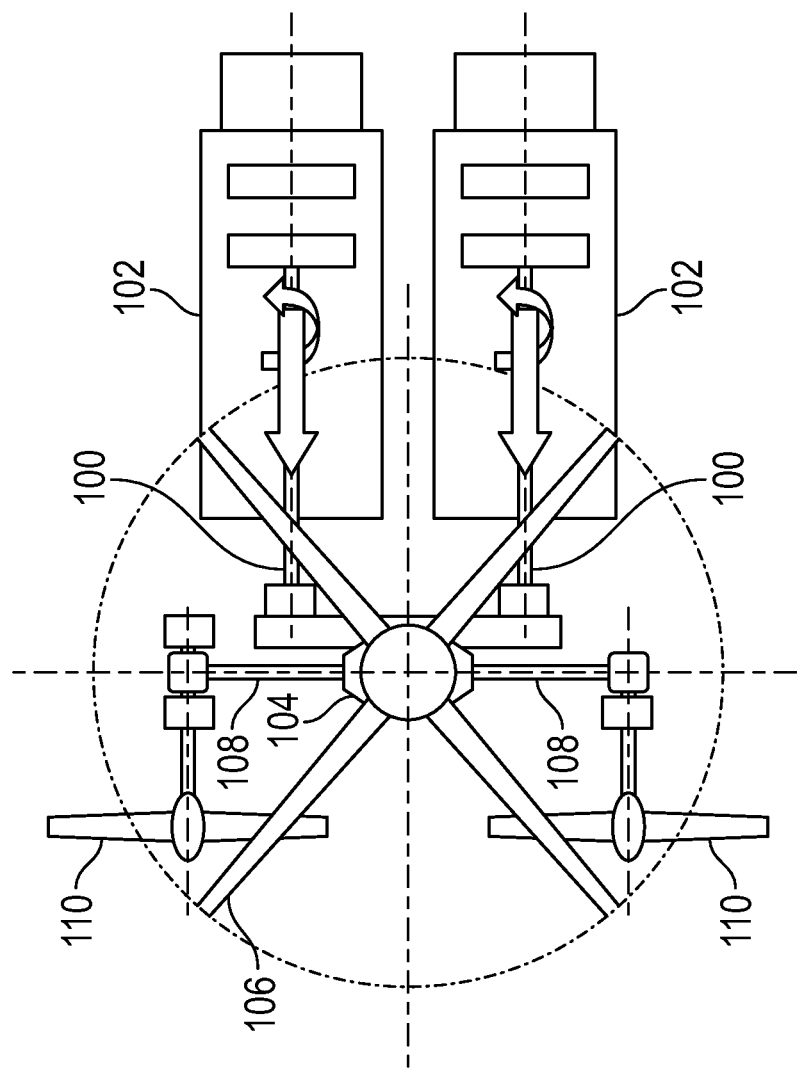
FIG. 5 is a schematic view of a prior art drive system arrangement.

Referring now to FIG. 4, another embodiment of a drive train arrangement is shown. In the embodiment of FIG. 4, the first engine 24a solely drives the main rotor assembly 18 and the second engine 24b solely drives the propulsor 42. The first engine 24a has a rotor power turbine 54 at the turbine section 52. The rotor power turbine 54 is connected to the rotor input shaft 56 to drive the main rotor assembly 18. The second engine 24b includes propulsor power turbine 58 connected to a propulsor input shaft 60 to drive the propulsor 42.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A drive system for a rotorcraft comprising:
   at least one engine, the engine including:
   a compressor section; and
   a turbine section disposed rearward from the compressor section;

a main rotor input shaft extending from a rotor power turbine of the turbine section and connectable to a main rotor assembly of the rotorcraft to transfer rotational energy from the rotor power turbine to the main rotor assembly; and an auxiliary input shaft extending from an auxiliary power turbine of the turbine section and connectible to an auxiliary rotor assembly of the rotorcraft to transfer rotational energy from the auxiliary power turbine to the auxiliary rotor assembly, wherein at least one of the rotor power turbine or the auxiliary power turbine includes a plurality of blades having variable alignment to adjust flow based on power for the auxiliary rotor assembly, wherein the at least one engine comprises at least two engines, including:
- a first engine having a main rotor input shaft extending from a rotor power turbine of the turbine section and connectable to the main rotor assembly of the rotorcraft; and
- a second engine having an auxiliary input shaft extending from an auxiliary power turbine of the turbine section and connectable to an auxiliary rotor assembly of the rotorcraft; and wherein the auxiliary rotor assembly differs in type of rotor from the main rotor assembly.

2. The drive system of claim 1, wherein the main rotor input shaft extends from the engine in a first direction, and the auxiliary input shaft extends from the engine in a second direction opposite the first direction.

3. The drive system of claim 1, wherein the main rotor input shaft extends from the rotor power turbine through the compressor section to connect with the main rotor assembly.

4. The drive system of claim 1, wherein the auxiliary rotor assembly is a propulsor.

5. The drive system of claim 1, further comprising at least two engines, each engine including:
- a main rotor input shaft extending from a rotor power turbine of the turbine section and connectable to the main rotor assembly of the rotorcraft; and
- an auxiliary input shaft extending from an auxiliary power turbine of the turbine section and connectible to an auxiliary rotor assembly of the rotorcraft.

6. The drive system of claim 5, wherein:
- a first auxiliary input shaft of a first engine of the at least two engines is connectible to a first auxiliary rotor; and
- a second auxiliary input shaft of a second engine of the at least two engines is connectible to a second auxiliary rotor.

7. A rotorcraft comprising:
an airframe;
a main rotor assembly operably connected to the airframe;
an auxiliary rotor assembly operably connected to the airframe; and
a drive system disposed at the airframe including:
at least one engine, the engine including:
a compressor section; and
a turbine section disposed rearward from the compressor section;

a main rotor input shaft extending from a rotor power turbine of the turbine section and operably connected to the main rotor assembly to transfer rotational energy from the rotor power turbine to the main rotor assembly; and an auxiliary input shaft extending from an auxiliary power turbine of the turbine section and operably connected to the auxiliary rotor assembly to transfer rotational energy from the auxiliary power turbine to the auxiliary rotor assembly, wherein at least one of the rotor power turbine or the auxiliary power turbine includes a plurality of blades having variable alignment to adjust flow based on power for the auxiliary rotor assembly, wherein the drive system further comprises at least two engines, including:
- a first engine having a main rotor input shaft extending from a rotor power turbine of the turbine section and connectable to the main rotor assembly; and
- a second engine having an auxiliary input shaft extending from an auxiliary power turbine of the turbine section and connectable to the auxiliary rotor assembly; and wherein the auxiliary rotor assembly differs in type of rotor from the main rotor assembly.

8. The rotorcraft of claim 7, wherein the main rotor input shaft extends from the engine in a first direction, and the auxiliary input shaft extends from the engine in a second direction opposite the first direction.

9. The rotorcraft of claim 7, wherein the main rotor input shaft extends from the rotor power turbine through the compressor section to connect with the main rotor assembly.

10. The rotorcraft of claim 7, wherein the auxiliary rotor assembly is a propulsor.

11. The rotorcraft of claim 7, further comprising at least two engines, each engine including:
- a main rotor input shaft extending from a rotor power turbine of the turbine section and connectable to the main rotor assembly; and
- an auxiliary input shaft extending from an auxiliary power turbine of the turbine section and connectible to the auxiliary rotor assembly.

12. The rotorcraft of claim 11, wherein:
- a first auxiliary input shaft of a first engine of the at least two engines is connectible to a first auxiliary rotor assembly; and
- a second auxiliary input shaft of a second engine of the at least two engines is connectible to a second auxiliary rotor assembly.

13. The rotorcraft of claim 7, wherein the main rotor assembly is a dual, counter rotating coaxial main rotor assembly.

14. The rotorcraft of claim 7, wherein the plurality of blades are aligned so as to reduce losses within the at least one engine.

* * * * *